US012736403B2

(12) United States Patent
Choi

(10) Patent No.: US 12,736,403 B2
(45) Date of Patent: Sep. 15, 2026

(54) SPECTRAL IMAGE SENSORS AND ELECTRONIC APPARATUSES INCLUDING THE SAME

(71) Applicant: SAMSUNG ELECTRONICS CO., LTD., Suwon-si (KR)

(72) Inventor: Heejin Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 210 days.

(21) Appl. No.: 18/091,916

(22) Filed: Dec. 30, 2022

(65) Prior Publication Data

US 2024/0019306 A1 Jan. 18, 2024

(30) Foreign Application Priority Data

Jul. 14, 2022 (KR) ........................ 10-2022-0087084

(51) Int. Cl.

*G01J 3/28* (2006.01)
*G01J 3/02* (2006.01)
*G01N 21/25* (2006.01)

(52) U.S. Cl.

CPC ........... *G01J 3/2823* (2013.01); *G01J 3/0208* (2013.01); *G01J 3/0291* (2013.01); *G01J 2003/2826* (2013.01); *G01N 21/25* (2013.01)

(58) Field of Classification Search

CPC ...... G01J 3/2823; G01J 3/0208; G01J 3/0297; G01J 3/0227; G01J 2003/2826; G01J 3/0291; G02B 3/08; G02B 5/1876; H04N 23/55; G01N 21/25

See application file for complete search history.

(56) References Cited

U.S. PATENT DOCUMENTS 7,688,531 B1 3/2010 Deng et al.
11,092,491 B1 * 8/2021 Powell .................. G01J 3/0208
2008/0165430 A1 * 7/2008 Bareau ............... G02B 13/0035 359/690
2008/0170302 A1 * 7/2008 Jeong ....................... G02B 9/12 359/716
2008/0291303 A1 11/2008 Onozawa et al.

(Continued)

FOREIGN PATENT DOCUMENTS

CN 111025528 A * 4/2020 ......... G02B 13/0045
JP 2010-92022 A 4/2010

(Continued)

OTHER PUBLICATIONS

Fresnel lens containing a flat, curved and patterned surface. https://web.archive.org/web/20050119085903/https://en.wikipedia.org/wiki/Fresnel_lens (Year: 2005).*

(Continued)

*Primary Examiner* — Michelle M Iacoletti
*Assistant Examiner* — Judy Dao Tran
(74) *Attorney, Agent, or Firm* — Sughrue Mion, PLLC

(57) ABSTRACT

A spectral image sensor includes: a first lens system; an infrared blocking filter; a second lens system configured to adjust a chief ray angle (CRA) of oblique incident light to reduce an incident angle of the oblique incident light with respect to a spectral filter; the spectral filter; and an image sensor. The image sensor may be configured to detect light passing through the first lens system, the infrared blocking filter, the second lens system, and the spectral filter.

21 Claims, 7 Drawing Sheets

(56) References Cited

U.S. PATENT DOCUMENTS

| | | | |
|---|---|---|---|
| 2009/0033788 A1 | 2/2009 | Machida et al. | |
| 2010/0002313 A1 | 1/2010 | Duparre et al. | |
| 2013/0141802 A1* | 6/2013 | Yang | G02B 13/004 359/717 |
| 2016/0233259 A1 | 8/2016 | Sekine | |
| 2016/0254304 A1* | 9/2016 | Chou | G02B 5/201 257/432 |
| 2017/0201657 A1* | 7/2017 | Wang | G02B 5/285 359/577 |
| 2019/0146133 A1* | 5/2019 | Palikaras | G02B 5/20 359/885 |
| 2020/0193580 A1* | 6/2020 | McCall | G06T 7/55 348/135 |
| 2021/0048342 A1* | 2/2021 | Kim | G01J 3/0205 |
| 2021/0132256 A1 | 5/2021 | Park et al. | |
| 2022/0082731 A1* | 3/2022 | Mun | G02B 13/0015 |
| 2023/0358923 A1 | 11/2023 | Park et al. | |
| 2023/0359004 A1* | 11/2023 | Niu | G02B 15/144113 |
| 2024/0175750 A1 | 5/2024 | Siddique et al. | |

FOREIGN PATENT DOCUMENTS

| | | | |
|---|---|---|---|
| JP | 2019-20259 | A | 2/2019 |
| JP | 2020-537193 | A | 12/2020 |
| KR | 10-2021-0042005 | A | 4/2021 |
| KR | 10-2021-0052177 | A | 5/2021 |
| KR | 10-2021-0093154 | A | 7/2021 |
| KR | 10-2022-0035971 | A | 3/2022 |
| WO | 2019/046827 | A1 | 3/2019 |
| WO | 2021/021671 | A1 | 2/2021 |

OTHER PUBLICATIONS

Onozawa et al., A MOS Image Sensor With a Digital-Microlens, IEEE Transactions on Electron Devices, vol. 55, No. 4, pp. 986-991, Apr. 2008.

Engelberg et al., “The advantages of metalenses over diffractive lenses,” Nature Communications, vol. 11, No. 1991, 2020, Total 4 pages.

Communication issued Jul. 24, 2024 by the Korean Intellectual Property Office for Korean Patent Application No. 10-2022-0087084.

Communication issued Mar. 20, 2025 by the Korean Intellectual Property Office in counterpart Korean Patent Application No. 10-2022-0087084.

* cited by examiner

FIG. 3

SPECTRAL IMAGE SENSORS AND ELECTRONIC APPARATUSES INCLUDING THE SAME

CROSS-REFERENCE TO RELATED APPLICATION

This application claims priority to Korean Patent Application No. 10-2022-0087084, filed on Jul. 14, 2022, in the Korean Intellectual Property Office, the disclosure of which is incorporated by reference herein in its entirety.

BACKGROUND

1. Field

Example embodiments of the present disclosure relate to image sensors, and more particularly, to spectral image sensors and electronic apparatuses including the spectral image sensors.

2. Description of Related Art

A spectral filter of a multispectral image sensor (MIS) is based on the resonance principle of a Fabry-Perot (FP) cavity. The FP cavity has a unique characteristic that a wavelength region, in which constructive interference of transmitted light occurs, is blue-shifted to shorter wavelengths according to an incident angle.

A camera module for a mobile phone has a field of view (FOV) of approximately +/−40°, and according to the FOV, a chief ray angle (CRA) for reaching an image sensor portion increases from 0° to approximately 30°. Accordingly, because the transmission band varies depending on the CRA, even channels having the same wavelength may have different transmission characteristics depending on their location on an image sensor.

For example, a channel located in a central portion of the image sensor may have an incident angle close to 0°. The incident angle increases for channel locations the more that they are disposed toward the outside of the image sensor. A channel located at an outermost edge of the image sensor may have an incident angle close to 30°. Additionally, the closer a channel is the outer edge of the image sensor, the more that transmission characteristics of the channel are more blue-shifted. Further, the blue-shift characteristics are intensified in channels having longer wavelengths.

SUMMARY

One or more example embodiments provide spectral image sensors configured to correct a chief ray angle (CRA) of oblique incident light.

One or more example embodiments provide electronic apparatuses including the spectral image sensors.

Additional aspects will be set forth in part in the description which follows and, in part, will be apparent from the description, or may be learned by practice of the presented embodiments of the disclosure.

A spectral image sensor may include: a first lens system; an infrared blocking filter; a second lens system configured to adjust a chief ray angle (CRA) of oblique incident light to reduce an incident angle of the oblique incident light with respect to a spectral filter; the spectral filter; and an image sensor. The image sensor may be configured to detect light passing through the first lens system, the infrared blocking filter, the second lens system, and the spectral filter.

The second lens system may be provided optically adjacent to the infrared blocking filter.

The second lens system may be provided on a surface of the infrared blocking filter, the second lens system being disposed between the infrared blocking filter and the spectral filter.

The second lens system may be provided optically adjacent to the spectral filter.

The second lens system may be provided on a surface of the spectral filter, the second lens system being disposed between the spectral filter and the infrared blocking filter.

The second lens system may include a meta-lens including a plurality of meta-patterns.

The second lens system may include a Fresnel lens including a plurality of patterns inclined with respect to an optical axis of the second lens system.

The infrared blocking filter may be provided between the first lens system and the second lens system, The first lens system may include a plurality of lenses having different refractive powers.

The image sensor may include a complementary metal-oxide semiconductor (CMOS) image sensor (CIS).

An electronic apparatus may include a spectral image sensor. The spectral image sensor may include: a first lens system; an infrared blocking filter; a second lens system configured to correct a chief ray angle (CRA) of oblique incident light; a spectral filter; and an image sensor. The spectral image sensor may be configured to detect light on the image sensor that has passed through the first lens system, the infrared blocking filter, the second lens system, and the spectral filter.

Each of the plurality of meta-patterns may include a height or diameter smaller than a wavelength of visible light or the plurality of meta-patters are spaced apart from each other at an interval smaller than the wavelength of visible light.

The Fresnel lens may include a flat surface and a patterned surface including a central convex surface surrounded by the plurality of patterns.

BRIEF DESCRIPTION OF THE DRAWINGS

The above and other aspects, features, and advantages of example embodiments of the disclosure will be more apparent from the following description taken in conjunction with the accompanying drawings, in which:

FIG. 3 is a cross-sectional view illustrating an example of a chief ray angle (CRA) adjustment optical element of the first spectral image sensor of FIG. 1;

DETAILED DESCRIPTION

Figure 1:
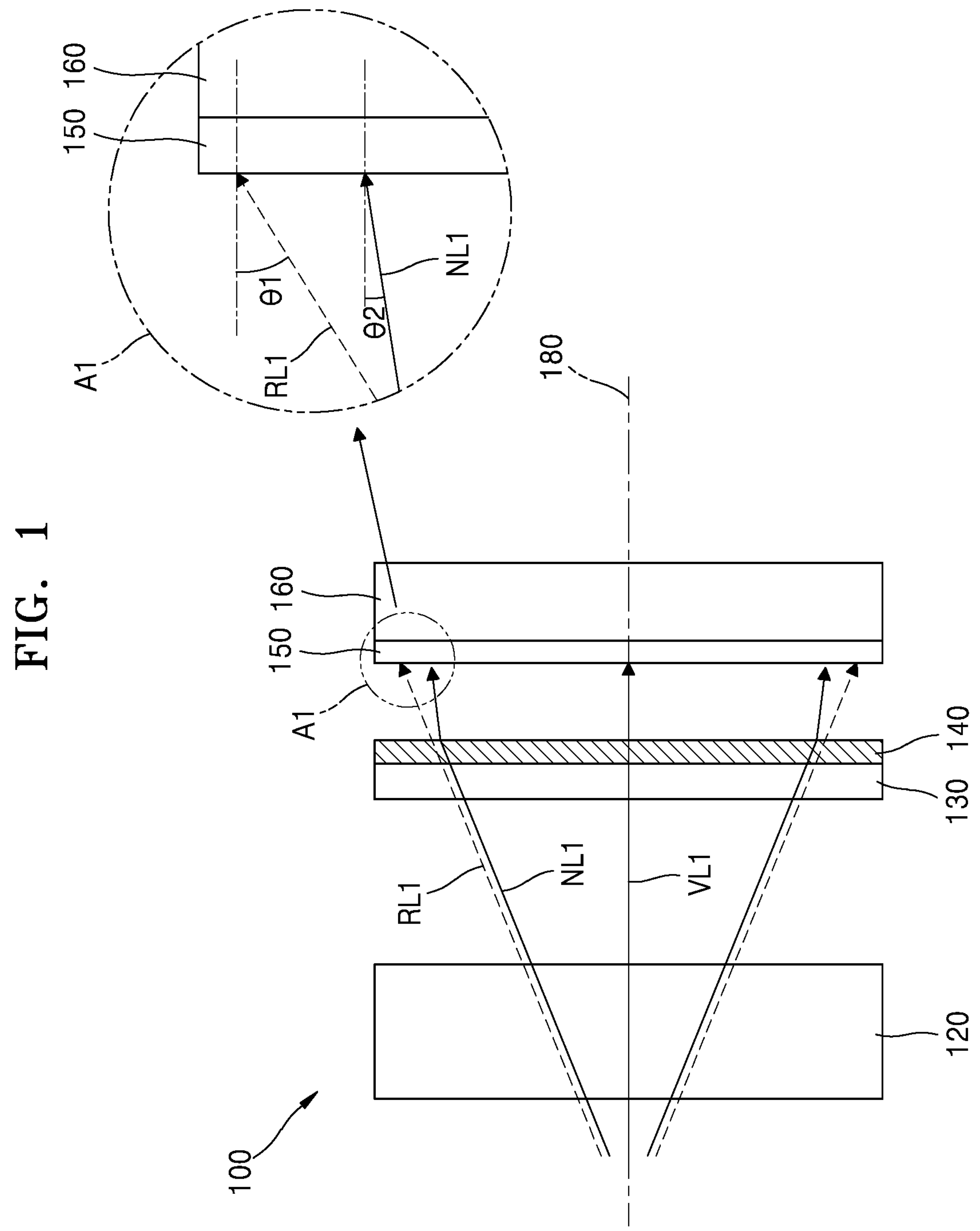
FIG. 1 is a cross-sectional view illustrating a first spectral image sensor according to an example embodiment.

Reference will now be made in detail to embodiments, examples of which are illustrated in the accompanying drawings, wherein like reference numerals refer to like elements throughout. In this regard, example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Hereinafter, a spectral image sensor and an electronic apparatus including the same according to example embodiments will be described in detail with reference to the accompanying drawings. In this process, thicknesses of layers or regions shown in the drawings may be exaggerated for clarity of the specification. Also, the embodiments described below are merely exemplary, and various modifications may be possible from the embodiments. In addition, in the layer structure described below, when an element or layer is referred to as being "on" or "above" another element or layer, the element or layer may be directly on another element or layer or intervening elements or layers. In the description below, like reference numerals in each drawing indicate like members.

FIG. 1 shows a first spectral image sensor 100 according to an example embodiment.

Referring to FIG. 1, the first spectral image sensor 100 includes a first lens system 120, an infrared blocking filter 130 that blocks infrared rays and allows transmission of visible light, a second lens system 140 disposed on one side of the infrared blocking filter 130, a spectral filter 150, and an image sensor 160.

The first lens system 120 may include a plurality of lenses. The plurality of lenses may include a glass lens, a plastic lens, a lens made of a non-glass/plastic material and/or a member having lens characteristics, but are not limited thereto. The plurality of lenses may have different optical characteristics and/or dimensions. For example, the plurality of lenses may have different refractive powers or focal lengths, at least some of the plurality of lenses may have different diameters in a direction perpendicular to an optical axis 180, and at least some of the plurality of lenses may have different thicknesses in a direction parallel to the optical axis 180. According to the configuration of the first lens system 120, the first lens system 120 and the infrared blocking filter 130 may be in direct contact with each other, or may be apart from each other by an optically transmissive appropriate distance. The infrared blocking filter 130 may remove infrared rays from incident light RL1, incident light NL1, and incident light VL1. The second lens system 140 may have a configuration different from that of the first lens system 120. For example, the number of optical elements included in the second lens system 140 may be different from that of the first lens system 120. Additionally, the second lens system 140 may be a lens system that is configured to adjust a chief ray angle (CRA) of the incident light NL1 and the incident light VL1 that are incident through the infrared blocking filter 130. Accordingly, the second lens system 140 may be expressed as a CRA adjustment lens system, a CRA adjustment optical system, a CRA adjustment optical element, a CRA adjustment member, or an incident angle adjustment optical element (device). The second lens system 140 may include an element that refracts or diffracts the incident light NL1 and the incident light VL1 in a direction that reduces the CRA of the incident light NL1 and the incident light VL1. In the case of the light VL1 that is incident perpendicularly to the second lens system 140 (i.e., incident parallel to the optical axis 180, because the light VL1 has a CRA of 0°), there may be no change in the CRA by the second lens system 140. In the case that the light NL1 is incident obliquely at a first acute angle with the optical axis 180, the light NL1 may be refracted inward while passing through the second lens system 140. Accordingly, the light NL1 that is incident on the second lens system 140 in a direction away from the optical axis 180 may be refracted in a direction close to the optical axis 180 by the second lens system 140. After passing through the second lens system 140, the light NL1 that is obliquely incident at a first acute angle with the optical axis 180 may form a second acute angle with the optical axis 180, or may be parallel to the optical axis 180. The second acute angle may be smaller than the first acute angle. For example, each of the incident light NL1 and the incident light VL1 may be visible light including a plurality of wavelengths. For example, each of the incident light NL1 and the incident light VL1 may include a red light band, a green light band, and a blue light band, as well as at least 4, at least 6, at least 8, at least 12, at least 16, at least 24, or at least 64 different wavelengths including visible light between the bands, but is not limited thereto.

The spectral filter 150 may include a spectral pixel array. The spectral pixel array may include a plurality of spectral pixels. For example, each of the spectral pixels may include 16 sub-pixels accommodating different wavelengths, but the number of sub-pixels may be more or less than 16. For example, the image sensor 160 may be configured to measure a spectral image, and may include a visible light image sensor. For example, the image sensor 160 may include a complementary metal-oxide semiconductor (CMOS) image sensor (CIS), but is not limited thereto. The image sensor 160 may include a plurality of pixels corresponding to the spectral pixels included in the spectral filter 150. For example, when one pixel of the spectral filter 150 includes 16 sub-pixels accommodating different wavelengths, the one pixel of the spectral filter 150 may correspond to a 4*4 pixel of the image sensor 160.

Reference numeral RL1 in FIG. 1 denotes oblique incident light (hereinafter, referred as reference light) that is incident on the spectral filter 150 through the infrared blocking filter 130 when the second lens system 140 is not provided. The reference light RL1 may be parallel to the oblique incident light NL1 in front of the infrared blocking filter 130. Comparing traveling directions of the reference light RL1 and the oblique incident light NL1 with each other, as shown in the enlarged view of a dashed circle A1, a CRA of the reference light RL1 with respect to the spectral filter 150 may have a first incident angle θ1, whereas a CRA of the oblique incident light NL1 with respect to the spectral filter 150 may have a second incident angle θ2 that is smaller than the first incident angle θ1. For example, the second incident angle θ2 may be 20° or less, 10° or less, or 5° or less, but is not limited thereto.

The spectral filter 150 may be a member for splitting the incident light RL1 and the incident light NL1 into a set number of different wavelengths for spectroscopy, and may include, for example, a Fabry-Perot (FP) cavity. The reference light RL1, which is oblique incident light, may pass through the FP cavity and generate a path difference, and a wavelength at which the path difference causes constructive interference to be shifted to a shorter wavelength than a wavelength of the reference light RL1. Accordingly, the reference light RL1 may undergo a blue-shift in which the wavelength of the reference light RL1 is shortened while passing through the spectral filter 150, and the degree of the blue-shift may increase in proportion to the CRA of the reference light RL1 with respect to the spectral filter 150. That is, the blue-shift of the reference light RL1 may increase as the CRA of the reference light RL1 with respect to the spectral filter 150 increases, and as a result, spectral characteristics (e.g., spectral image quality, spectral analysis accuracy) of the reference light RL1 may decrease.

The oblique incident light NL1, which is incident on the spectral filter 150 through the second lens system 140, may have a decreased CRA with respect to the spectral filter 150 while passing through the second lens system 140, and the CRA of the light NL1 with respect to the spectral filter 150 may be substantially close to 0°. As a result, a blue-shift of the oblique incident light NL1 that has passed through the spectral filter 150 is much lower than that of the reference light RL1. Accordingly, spectral characteristics of the first spectral image sensor 100 may be improved, compared to those of traditional spectral image sensors which do not include the second lens system 140.

Figure 2:
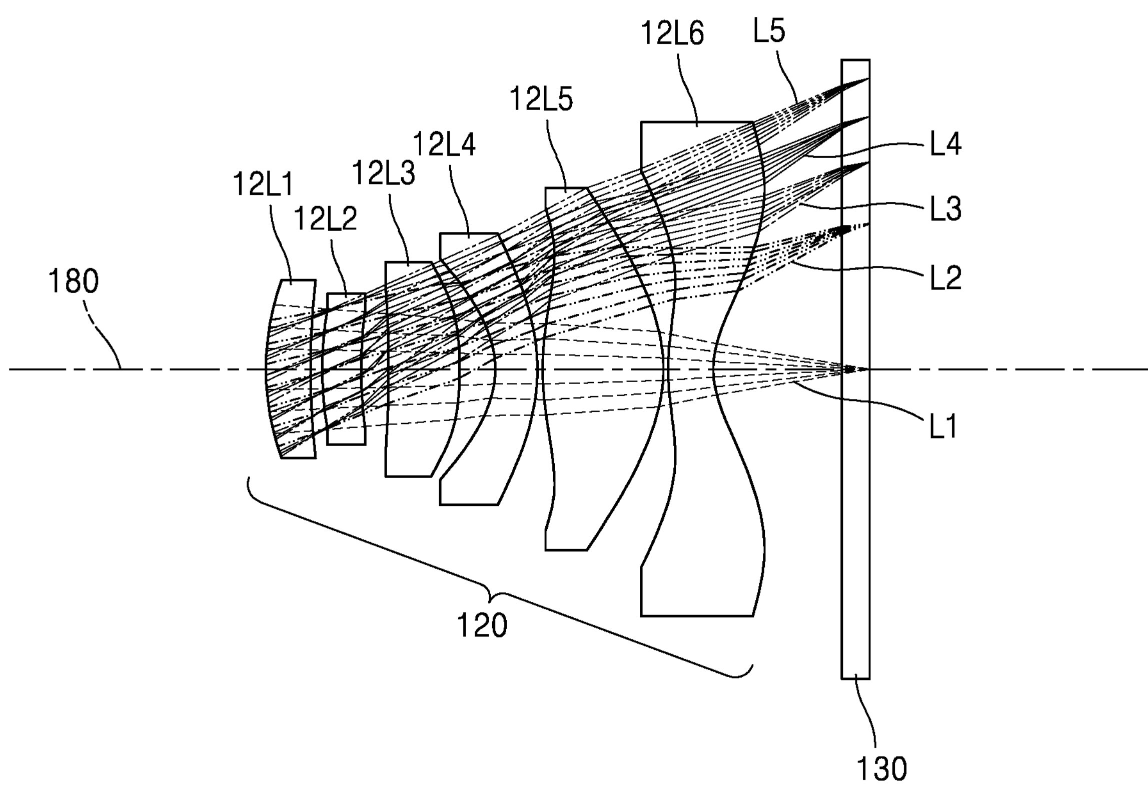
FIG. 2 is a cross-sectional view illustrating an example of a lens optical system included in the first spectral image sensor of FIG. 1.

FIG. 2 shows an example of the first lens system 120 of FIG. 1.

Referring to FIG. 2, the first lens system 120 may include first to sixth lenses 12L1 to 12L6, but the number of lenses may be more or less than 6. Each of the first to sixth lenses 12L1 to 12L6 may be a glass lens or a plastic lens. For example, some of the first to sixth lenses 12L1 to 12L6 may be glass lenses, and the rest of the first to sixth lenses 12L1 to 12L6 may be plastic lenses. The first to sixth lenses 12L1 to 12L6 may have different radii in a direction perpendicular to the optical axis 180, but some of the first to sixth lenses 12L1 to 12L6 may have the same radius in the direction perpendicular to the optical axis 180. However, the first to sixth lenses 12L1 to 12L6 are not limited thereto.

For example, the first to sixth lenses 12L1 to 12L6 may have different powers or refractive powers. In one example, one surface or both surfaces of each of the first, second, third, and fourth lenses 12L1, 12L2, 12L3, and 12L4 may have a positive refractive power, but the first, second, third, and fourth lenses 12L1, 12L2, 12L3, and 12L4 may have different degrees of refractive power and different focal lengths. In another example, one surface or both surfaces of each of the fourth and sixth lenses 12L4 and 12L6 may have a negative refractive power, but the fourth and sixth lenses 12L4 and 12L6 may have different degrees of refractive power and different focal lengths. Alignment or optical characteristics of the first to sixth lenses 12L1 to 12L6 may vary depending on the role or purpose of the first lens system 120.

Reference numeral L1 in FIG. 2 denotes light that is perpendicularly incident on the infrared blocking filter 130, and reference numerals L2, L3, L4, and L5 denote light obliquely incident on the infrared blocking filter 130. The light L2-L5 have different wavelengths. In the case of the oblique light L2 to L5, a CRA increases away from the optical axis 180.

The first lens system 120 may include a planar lens. Light that has passed through the first lens system 120 may have a specific phase profile according to elements constituting the first lens system 120, and a meta-lens may be manufactured so that the phase profile is formed by using information on the phase profile. In this case, the meta-lens may be formed as a single layer or a multi-layer.

Figure 3:
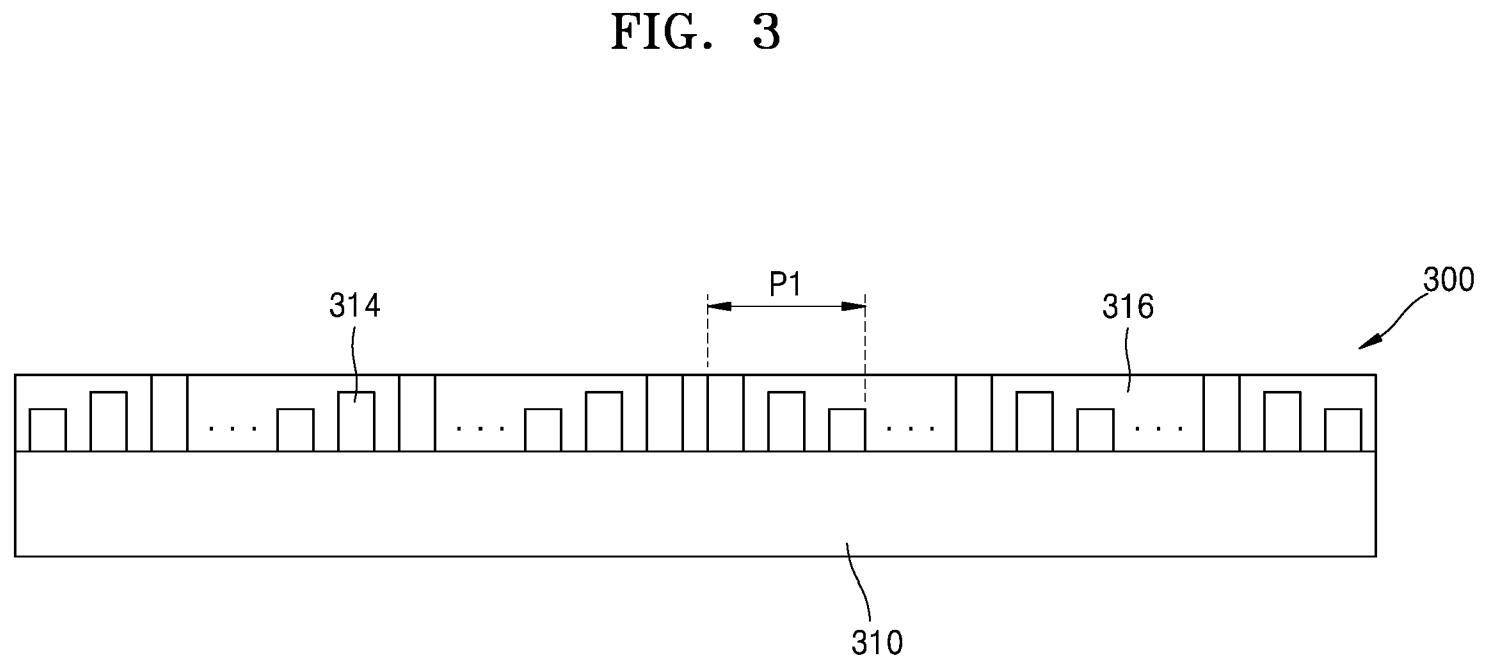

For example, the second lens system 140 of FIG. 1 may include a meta-lens 300 shown in FIG. 3.

Referring to FIG. 3, the meta-lens 300 may include a substrate 310, a plurality of meta-patterns 314 formed on the substrate 310, and a transparent material layer 316 that has a low refractive index and fills between the meta-patterns 314. The substrate 310 may be a substrate that is transparent to incident light.

A dimension of each of the meta-patterns 314 may be smaller than a wavelength of incident light. For example, a diameter, a height, and/or an interval of each meta-pattern 314 may be smaller than the wavelength of incident light. Because the wavelength of incident light (e.g., visible light) is several hundred nanometers, each meta-pattern 314 may be expressed as a nano-pattern. The meta-patterns 314 may be arranged with a period P1, and the period P1 may vary from a center of the meta-lens 300 to an edge thereof. For example, the period P1 may be shortened from the center of the meta-lens 300 to the edge thereof. In FIG. 3, for convenience of description, the period P1 is shown to be constant. A plurality of meta-patterns 314 may be formed in one period P1. FIG. 3 shows that three meta-patterns 314 having different heights are included in one period P1, but this is just an example, and the number of meta-patterns 314 included in one period P1 is not limited thereto. For example, in one period P1, four or more meta-patterns 314 having different heights may be sequentially arranged in a lateral direction (i.e., a direction parallel to the substrate 310).

For example, the meta-pattern 314 may be transparent to incident light, and may be formed of a material having a higher refractive index than that of the transparent material layer 316. For example, a material for the meta-pattern 314 may be $TiO_2$, but is not limited thereto. The transparent material layer 316 that is transparent to incident light may include a material having a lower refractive index than that of the meta-pattern 314. The transparent material layer 316 may include silicon oxide (e.g., $SiO_2$), but is not limited thereto. Some of the plurality of meta-patterns 314 may be covered with the transparent material layer 316. All of the plurality of meta-patterns 314 may be expressed as a meta-surface, and the meta-surface may include the transparent material layer 316.

The meta-lens 300 may be provided in front of the infrared blocking filter 130.

Figure 4:
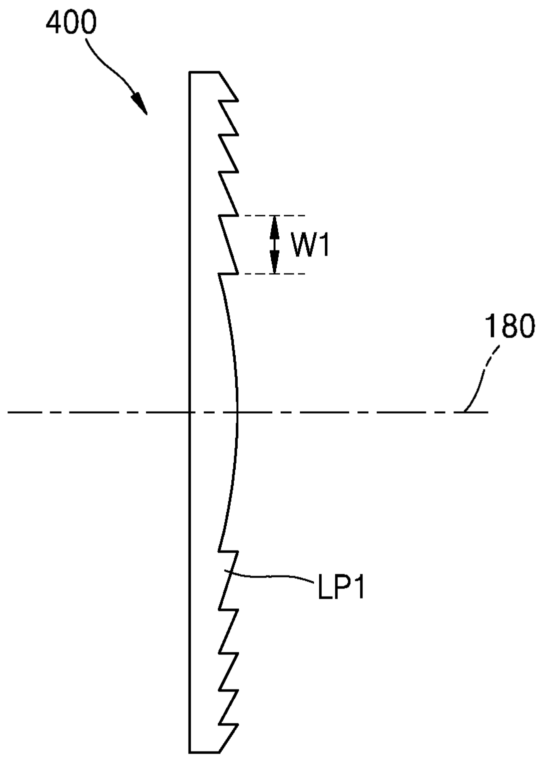
FIG. 4 is a cross-sectional view illustrating an example of the CRA adjustment optical element of the first spectral image sensor of FIG. 1.

The second lens system 140 as shown in FIG. 1 may include a Fresnel lens 400 shown in FIG. 4. One surface of the Fresnel lens 400 may be flat, and a surface opposite to the one surface may be formed to have a plurality of patterns LP1 that reduce a divergence angle (inclined angle with respect to the optical axis 180) of incident light. In other words, the opposite surface of the Fresnel lens 400 may be formed to have a plurality of patterns LP1 that reduce a CRA of incident light. Accordingly, light that has passed through the Fresnel lens 400 may have a smaller divergence angle than before passing through the Fresnel lens 400. The opposite surface of the Fresnel lens 400 may have a convex surface in a center thereof. The plurality of patterns LP1 may be present around the convex surface, and each of the plurality of patterns LP1 may have an inclined surface. A planar shape of each of the plurality of patterns LP1 is circular and concentric. The plurality of patterns LP1 may be continuously distributed in a direction perpendicular to the optical axis 180 passing through a center of the Fresnel lens 400, each pattern LP1 may have a width W1 in the direction perpendicular to the optical axis 180, and the width W1 may decrease away from the optical axis 180.

Figure 5:
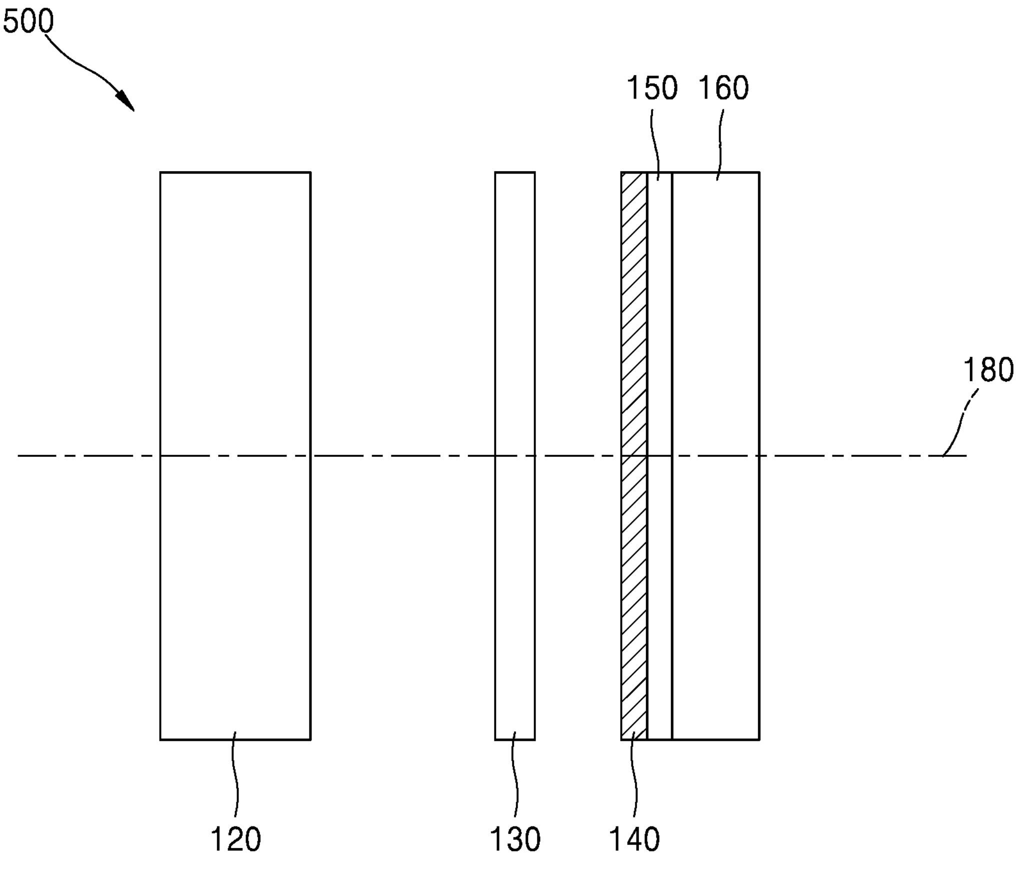
FIG. 5 is a cross-sectional view illustrating a second spectral image sensor according to an example embodiment.

FIG. 5 shows a second spectral image sensor 500 according to an example embodiment. Only parts different from those of the first spectral image sensor 100 of FIG. 1 will be described.

Referring to FIG. 5, although the second lens system 140 may be provided between the infrared blocking filter 130 and the spectral filter 150, the second lens system 140 may not provided on a side of the infrared blocking filter 130, but instead on a side of the spectral filter 150. For example, the second lens system 140 may be apart from the infrared blocking filter 130 and in direct contact with the spectral filter 150. For example, the second lens system 140 may be integrally formed as a single body with the spectral filter 150. While forming an FP cavity as the spectral filter 150, the second lens system 140 may be formed on a light incident surface of the cavity. Another transparent member (e.g., a material layer) may be further provided between the spectral filter 150 and the second lens system 140. The other member may be one of the elements for CRA correction, like the second lens system 140, or may be an element for improving other spectral characteristics. For example, the second lens system 140 may be the meta-lens 300 shown in FIG. 3 or the Fresnel lens 400 shown in FIG. 4, but is not limited thereto. When the second lens system 140 is the meta-lens 300 of FIG. 3, the meta-surface including the meta-pattern 314 may be a light incident surface. When the second lens system 140 is the Fresnel lens 400 of FIG. 4, the surface on which the plurality of patterns LP1 are formed may be a light incident surface.

Figure 6:
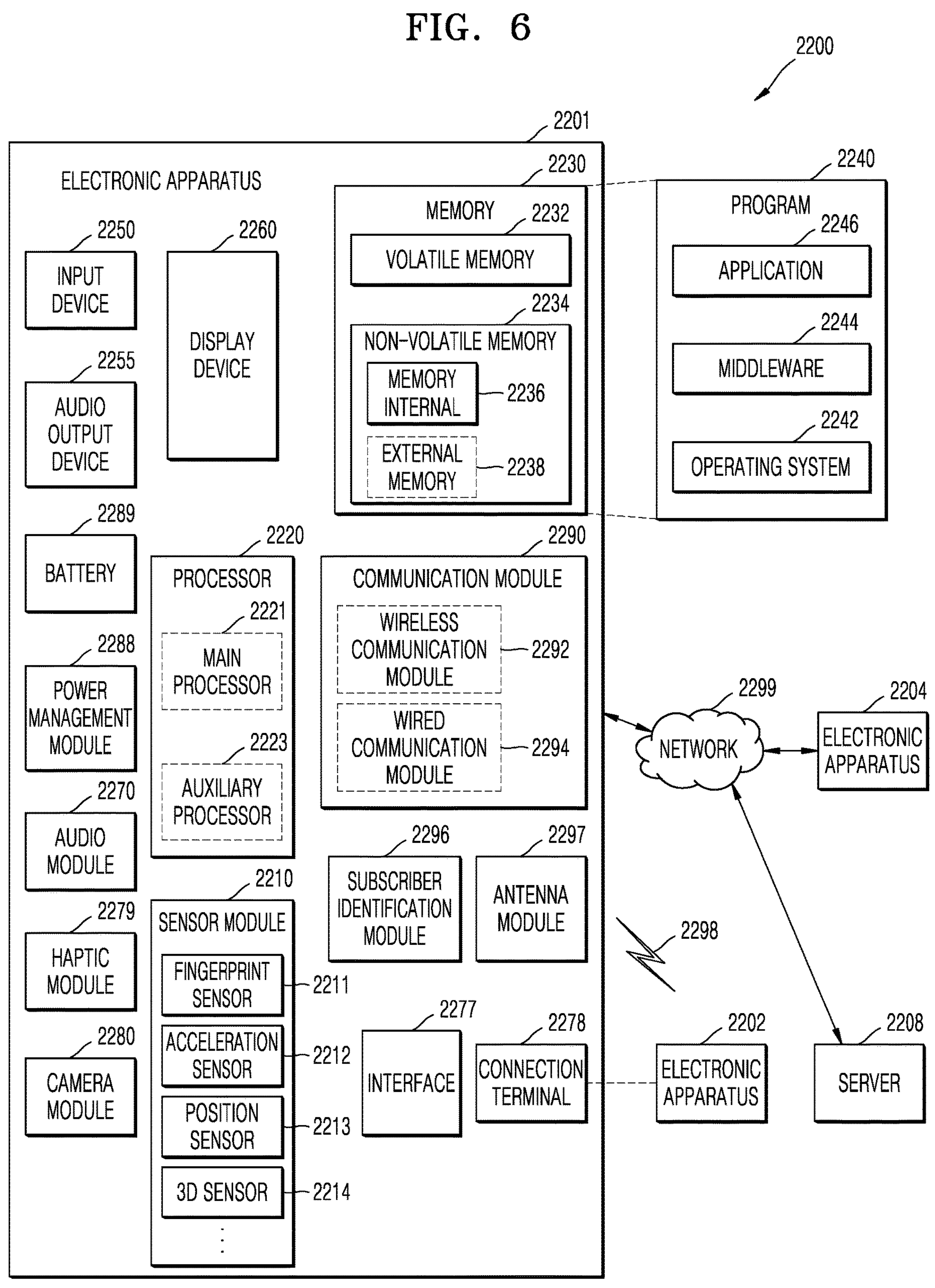
FIG. 6 is a block diagram illustrating an electronic apparatus according to an example embodiment.

The spectral image sensor according to an example embodiment described above may be applied to various electronic apparatuses, and FIG. 6 shows an example embodiment thereof.

Referring to FIG. 6, an electronic apparatus 2201 in a network environment 2200 may communicate with another electronic apparatus 2202 through a first network 2298 (e.g., a short-range wireless communication network), or with another electronic apparatus 2204 and/or a server 2208 through a second network 229 (e.g, a long-range wireless communication network). The electronic apparatus 2201 may communicate with an electronic apparatus 2204 through a server 2208. The electronic apparatus 2201 may include a processor 2220, a memory 2230, an input device 2250, an acoustic output device 2255, a display device 2260, an audio module 2270, a sensor module 2210, an interface 2277, a haptic module 2279, a camera module 2280, a power management module 2288, a battery 2289, a communication module 2290, a subscriber identity module 2296, and/or an antenna module 2297. Some (such as the display device 2260) of these components may be omitted from or other components may be added to the electronic apparatus 2201. Some of these components may be implemented as one integrated circuit. For example, a fingerprint sensor 2211, or an iris sensor, an illuminance sensor, etc., of the sensor module 2210 may be embedded in the display device 2260 (such as a display).

The processor 2220 may be configured to execute software (e.g., program 2240) to control one or a plurality of other components (e.g., hardware and software components) of the electronic apparatus 2201 connected to the processor 2220, and may perform processing or operations of various data. As part of processing or operations of data, the processor 2220 may load commands and/or data received from other components (e.g., the sensor module 2210 and/or the communication module 2290) into the volatile memory 2232, process commands and/or data stored in the volatile memory 2232, and store the resultant data in the nonvolatile memory 2234. The processor 2220 may include a main processor 2221 (e.g., a central processing unit, an application processor), and an auxiliary processor 2223 (e.g., graphics processing unit, image signal processor, sensor hub processor, and/or communication processor) that may be operated independently of or together with the main processor. The auxiliary processor 2223 may use less power than the main processor 2221 and perform a specialized function.

The auxiliary processor 2223 may be configured to control functions and/or states related to some (the display device 2260, sensor module 2210, and/or communication module 2290) of the components of the electronic apparatus 2201, in place of the main processor 2221 while the main processor 2221 is in an inactive state (e.g., slip state), or together with the main processor 2221 while the main processor 2221 is in an active state (e.g., application execution state). The auxiliary processor 2223 (e.g., image signal processor and/or communication processor) may be implemented as part of other functionally related components (e.g., the camera module 2280 and/or communication module 2290).

The memory 2230 may be configured to store various data required by the components of the electronic apparatus 2201 (e.g., the processor 2220 and/or the sensor module 2276). The data may include, for example, software (e.g., program 2240) and input data and/or output data for the command associated therewith. The memory 2230 may include volatile memory 2232 and/or nonvolatile memory 2234. The nonvolatile memory 2234 may include a built-in memory 2236 and an external memory 2238. In some examples, the nonvolatile memory 2234 may include a magnetic memory device using a spin current according to the above-described example embodiment.

The program 2240 may be stored in the memory 2230 as software, and may include an operating system 2242, middleware 2244, and/or an application 2246.

The input device 2250 may be configured to receive commands and/or data to be used in components (e.g., processor 2220) of the electronic apparatus 2201 from the outside (e.g., a user) of the electronic apparatus 2201. The input device 2250 may include a microphone, a mouse, a keyboard, and/or a digital pen (such as a stylus and/or pen).

The sound output device 2255 may be configured to output the sound signal to the outside of the electronic apparatus 2201. The sound output device 2255 may include a speaker and/or a receiver. Speakers may be used for general purposes such as multimedia playback or recording playback, and receivers may be used to receive incoming calls. The receiver may be coupled as part of a speaker or may be implemented as an independent separate device.

The display device 2260 may be configured to visually provide information to the outside of the electronic apparatus 2201. The display device 2260 may include one or more of a display, a hologram device, or a projector and a control circuit for controlling the corresponding devices. The display device 2260 may include a touch circuitry configured to sense a touch, and/or a sensor circuit (e.g., a pressure sensor) configured to measure an intensity of a force generated by the touch.

The audio module 2270 may convert sound into an electrical signal or conversely convert the electrical signal into sound. The audio module 2270 may acquire sound through the input device 2250, or output sound through a communication module, and/or a speaker and/or a headphone of another electronic apparatus (e.g., electronic apparatus 2102) directly or wirelessly connected to the electronic apparatus 2201.

The sensor module 2210 may be configured to detect an operating state (e.g., power and/or temperature) of the electronic apparatus 2201 or an external environmental state (e.g., user state) of the electronic apparatus 2201 and generate an electrical signal and/or a data value corresponding to the sensed state. The sensor module 2210 may include a fingerprint sensor 2211, an acceleration sensor 2212, a position sensor 2213, a 3D image sensor 2214, etc. In addition, the sensor module 2210 may include one or more of an iris sensor, a gyro sensor, an atmospheric pressure sensor, a magnetic sensor, a grip sensor, a proximity sensor, a color sensor, an infrared sensor, a biometric sensor, a temperature sensor, a humidity sensor, and/or an illuminance sensor.

The 3D image sensor 2214 may be configured to sense the shape and movement of an object by irradiating a predetermined light to the object and analyzing the light reflected from the object, and may include a meta-optical device.

The interface 2277 may be configured to support one or more specified protocols that can be used to connect the electronic apparatus 2201 directly or wirelessly with other electronic apparatus (e.g., electronic apparatus 2202). The interface 2277 may include one or more of a high definition multimedia interface (HDMI), a universal serial bus (USB) interface, an SD card interface, and/or an audio interface.

The connection terminal 2278 may include a connector through which the electronic apparatus 2201 can be physically connected to another electronic apparatus (e.g., the electronic apparatus 2102). The connection terminal 2278 may include one or more of an HDMI connector, a USB connector, an SD card connector, and/or an audio connector (such as a headphone connector).

The haptic module 2279 may be configured to convert an electrical signal into a mechanical stimulus (e.g., vibration and/or movement) or electrical stimulus that can be recognized by the user through touch or motor sensation. The haptic module 2279 may include one or more of a motor, a piezoelectric element, and/or an electrical stimulus device.

A camera module 2280 may be configured to capture still images and moving images. For example, the camera module 2280 may include an imaging system including one of the spectral image sensors described above with reference to FIGS. 1 to 5. For example, the camera module 2280 may include a window assembly, image sensors, image signal processors, and/or flashes. The window assembly included in the camera module 2280 may collect light emitted from a subject from which an image is to be captured. A power management module 2288 may manage power supplied to the electronic apparatus 2201. The power management module 2288 may be implemented as part of a power management integrated circuit (PMIC).

A battery 2289 may be configured to supply power to components of the electronic apparatus 2201. The battery 2289 may include a non-rechargeable primary cell, a rechargeable secondary cell, and/or a fuel cell.

A communication module 2290 may be configured to establish a direct (e.g., wired) communication channel and/or wireless communication channel between the electronic apparatus 2201 and other electronic apparatuses (e.g., an electronic apparatus 2202, an electronic apparatus 2204, and/or a server 2208) and perform communication through the established communication channel. The communication module 2290 may include one or more communication processors that operate independently from a processor 2220 (e.g., an application processor) and support direct communication and/or wireless communication. The communication module 2290 may include a wireless communication module 2292 (e.g., a cellular communication module, a short-range wireless communication module, and/or a global navigation satellite system (GNSS) communication module) and/or a wired communication module 2294 (e.g., a local area network (LAN) communication module and/or a power line communication module). Among these communication modules, a corresponding communication module may communicate with other electronic apparatuses through a first network 2298 (e.g., a short-range communication network, such as Bluetooth, WiFi Direct, or Infrared Data Association (IrDA)) or a second network 2299 (e.g., a telecommunication network, such as a cellular network, the Internet, or a computer network (e.g., a LAN, a wide area network (WAN))). These various types of communication modules may be integrated into one component (e.g., a single chip) or implemented as a plurality of components (e.g., a plurality of chips) separate from each other. The wireless communication module 2292 may be configured to identify and authenticate the electronic apparatus 2201 within a communication network, such as the first network 2298 and/or the second network 2299, by using subscriber information (an international mobile subscriber identifier (IMSI), etc.) stored in a subscriber identification module 2296.

An antenna module 2297 may be configured to transmit or receive signals and/or power to and from the outside (e.g., another electronic apparatus). An antenna may include a radiator having a conductive pattern formed on a substrate (e.g., a printed circuit board (PCB)). The antenna module 2297 may include one or a plurality of antennas. When a plurality of antennas are included in the antenna module 2297, an antenna suitable for a communication method used in a communication network, such as the first network 2298 and/or the second network 2299, is selected among the plurality of antennas by the communication module 2290. Signals and/or power may be transmitted or received between the communication module 2290 and another electronic apparatus through the selected antenna. Other components (e.g., a radio-frequency integrated circuit (RFIC)) in addition to the antenna may be included as part of the antenna module 2297.

Some of the components may be connected to each other and exchange signals (e.g., commands and/or data) through a communication method (e.g., a bus, general purpose input and output (GPIO), a serial peripheral interface (SPI), and/or a mobile industry processor interface (MIPI)) between peripheral devices.

Commands or data may be transmitted or received between the electronic apparatus 2201 and an external electronic, that is, the electronic apparatus 2204, through the server 2208 connected to the second network 2299. The other electronic apparatuses 2202 and 2204 may be of the same type as or a different type from the electronic apparatus 2201. All or some of the operations executed by the electronic apparatus 2201 may be executed by one or more of the other electronic apparatuses 2202 and 2204 and the server 2208. For example, when the electronic apparatus 2201 needs to perform a function or service, instead of executing the function or service itself, the electronic apparatus 2201 may request one or more other electronic apparatuses to perform part or all of the function or service. One or more other electronic apparatuses receiving the request may execute an additional function or service related to the request, and may transmit a result of the execution to the electronic apparatus 2201. To this end, cloud computing, distributed computing, and/or client-server computing technologies may be used.

Figure 7:
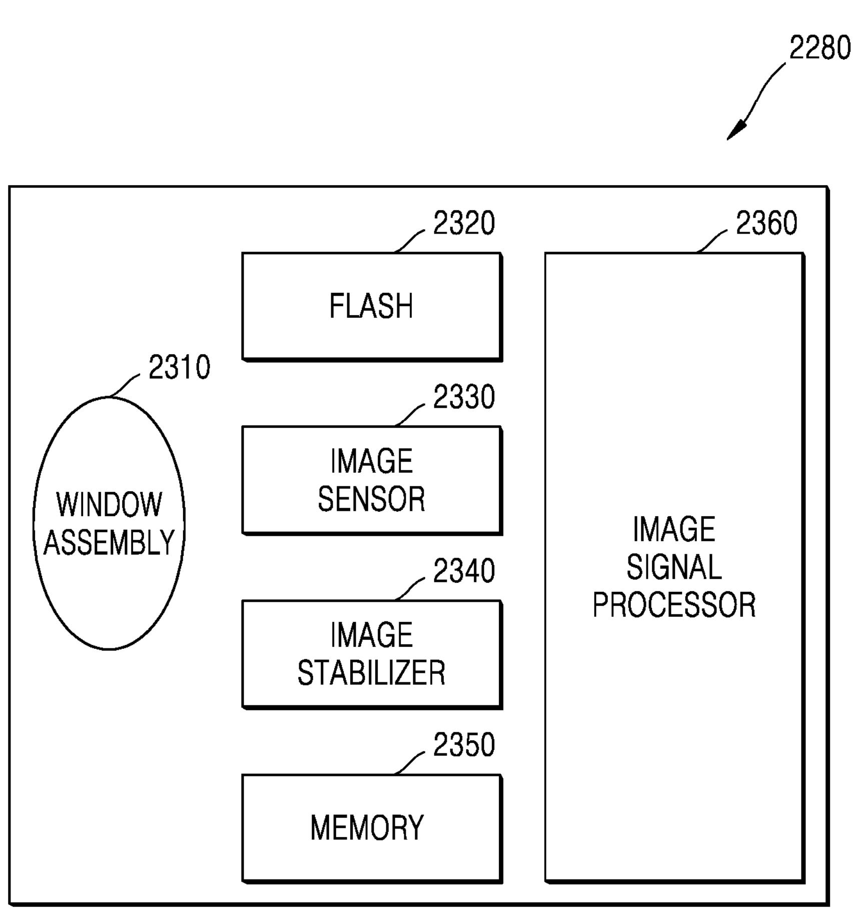
FIG. 7 is a block diagram illustrating a schematic configuration of a camera module included in the electronic apparatus of FIG. 6.

FIG. 7 is a block diagram illustrating a schematic configuration of the camera module 2280 included in the electronic apparatus 2201 of FIG. 6.

Referring to FIG. 7, the camera module 2280 may include a window assembly 2310, a flash 2320, an image sensor 2330, an image stabilizer 2340, a memory 2350 (e.g., a buffer memory), and/or an image signal processor 2360. The window assembly 2310 may collect light emitted from a subject from which an image is to be captured, and may include a window layer, at least one coded mask layer, a filter layer, and an anti-reflection film.

The camera module 2280 may include a plurality of window assemblies 2310, and in this case, the camera module 2280 may be a dual camera, a 360° camera, or a spherical camera. Some of the plurality of window assemblies 2310 may have the same optical characteristic (angle of view, focal length, auto focus, F number, and/or optical zoom), or may have different optical characteristics. The window assembly 2310 may include optical characteristics corresponding to a wide-angle lens or a telephoto lens.

The flash 2320 may emit light that is used to increase light emitted or reflected from a subject. The flash 2320 may include one or more light-emitting diodes (LEDs) (e.g., a red-green-blue (RGB) LED, a white LED, an infrared LED, and/or an ultraviolet LED) and/or a xenon lamp. The image sensor 2330 may acquire an image corresponding to the subject by converting light emitted or reflected from the subject and transmitted through the window assembly 2310 into an electrical signal. The image sensor 2330 may include one of the spectral image sensors described above with reference to FIGS. 1 to 5.

The image stabilizer 2340 may compensate for a negative effect of movement by moving the window assembly 2310 or the image sensor 2330 in a specific direction or controlling operation characteristics (e.g., adjustment of read-out timing) of the image sensor 2330 in response to movement of the camera module 2280 or the electronic apparatus 2201 including the same. The image stabilizer 2340 may detect the movement of the camera module 2280 or the electronic apparatus 2201 by using a gyro sensor (not shown) or an acceleration sensor (not shown) arranged inside or outside the camera module 2280. The image stabilizer 2340 may be optically implemented.

The memory 2350 may store some or all data of an image acquired through the image sensor 2330 for a subsequent image processing operation. For example, when a plurality of images are acquired at a high speed, the acquired original data (e.g., Bayer-patterned data and/or high-resolution data) may be stored in the memory 2350 and only a low-resolution image may be displayed, and then, the original data of a selected (e.g., user selection) image may be transmitted to the image signal processor 2360. The memory 2350 may be integrated into the memory 2230 of the electronic apparatus 2201, or may be configured as a separate memory that is independently operated. The memory 2350 may also include a restoration algorithm for an image restoration operation to be performed by the image signal processor 2360.

The image signal processor 2360 may perform one or more image processing on an image acquired through the image sensor 2330 or image data stored in the memory 2350. The one or more image processing may include depth map generation, three-dimensional modeling, panorama generation, feature point extraction, image synthesis, image restoration, and/or image compensation (e.g., noise reduction, resolution adjustment, brightness adjustment, blurring, sharpening, and/or softening). The image signal processor 2360 may perform control (e.g., exposure time control and/or read-out timing control) on components (e.g., the image sensor 2330) included in the camera module 2280. An image processed by the image signal processor 2360 may be stored back in the memory 2350 for further processing, or may be provided to an external component (e.g., the memory 2230, a display device 2260, the electronic apparatus 2202, the electronic apparatus 2204, and/or the server 2208) of the camera module 2280. The image signal processor 2360 may be integrated into the processor 2220, or may be configured as a separate processor that is operated independently from the processor 2220. When the image signal processor 2360 is configured as a separate processor from the processor 2220, an image processed by the image signal processor 2360 may be subjected to additional image processing by the processor 2220 and then displayed on the display device 2260.

The electronic apparatus 2201 may include a plurality of camera modules 2280 each having different properties or functions. In this case, one of the plurality of camera modules 2280 may be a wide-angle camera, and another may be a telephoto camera. Similarly, one of the plurality of camera modules 2280 may be a front camera, and another may be a rear camera.

The disclosed spectral image sensor includes an optical element for CRA correction on a side of an infrared blocking filter side or on a side of a spectral filter. The optical element lowers a CRA of oblique incident light, and thus, light that is obliquely incident on the spectral filter has a lower CRA than that incident on the optical element. Accordingly, when the disclosed spectral image sensor is used, spectral characteristics of an existing spectral image sensor may be improved. For example, by using the disclosed spectral image sensor, it is possible to prevent or reduce degradation of spectral characteristics due to blue-shifting of the existing spectral image sensor, that is, degradation of the spectral characteristics due to shifting of a wavelength in the shorter wavelength direction as oblique incident light passes through the spectral filter.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A spectral image sensor comprising:

a first lens system comprising a plurality of lenses;

an infrared blocking filter;

a second lens system configured to adjust a chief ray angle (CRA) of oblique incident light to refract light passing through the second lens system to reduce a divergence of the light, and to reduce an incident angle of the oblique incident light with respect to a spectral filter, the second lens system contacting the infrared blocking filter;

the spectral filter; and an image sensor;

wherein the image sensor is configured to detect light passing through the first lens system, the infrared blocking filter, the second lens system, and the spectral filter, wherein the spectral filter is between the second lens system and the image sensor, and the spectral filter contacts the image sensor, and wherein the first lens system, the infrared blocking filter, the second lens system, the spectral filter, and the image sensor are provided in that order.

2. The spectral image sensor of claim 1, wherein the second lens system is provided optically adjacent to the infrared blocking filter.

3. The spectral image sensor of claim 2, wherein the second lens system is provided on a surface of the infrared blocking filter.

4. The spectral image sensor of claim 1, wherein the second lens system is provided optically adjacent to the spectral filter.

5. The spectral image sensor of claim 4, wherein the second lens system is provided on a surface of the spectral filter, the second lens system being disposed between the spectral filter and the infrared blocking filter.

6. The spectral image sensor of claim 1, wherein the second lens system comprises a meta-lens including a plurality of meta-patterns.

7. The spectral image sensor of claim 2, wherein the second lens system comprises a meta-lens including a plurality of meta-patterns.

8. The spectral image sensor of claim 3, wherein the second lens system comprises a meta-lens including a plurality of meta-patterns.

9. The spectral image sensor of claim 4, wherein the second lens system comprises a meta-lens including a plurality of meta-patterns.

10. The spectral image sensor of claim 5, wherein the second lens system comprises a meta-lens including a plurality of meta-patterns.

11. The spectral image sensor of claim 1, wherein the second lens system comprises a Fresnel lens including a plurality of patterns inclined with respect to an optical axis of the second lens system.

12. The spectral image sensor of claim 2, wherein the second lens system comprises a Fresnel lens including a plurality of patterns inclined with respect to an optical axis of the second lens system.

13. The spectral image sensor of claim 3, wherein the second lens system comprises a Fresnel lens including a plurality of patterns inclined with respect to an optical axis of the second lens system.

14. The spectral image sensor of claim 4, wherein the second lens system comprises a Fresnel lens including a plurality of patterns inclined with respect to an optical axis of the second lens system.

15. The spectral image sensor of claim 5, wherein the second lens system comprises a Fresnel lens including a plurality of patterns inclined with respect to an optical axis of the second lens system.

16. The spectral image sensor of claim 1:

wherein the infrared blocking filter is provided between the first lens system and the second lens system, and wherein the plurality of lenses of the first lens system have different refractive powers.

17. The spectral image sensor of claim 1, wherein the image sensor comprises a complementary metal-oxide semiconductor (CMOS) image sensor (CIS).

18. An electronic apparatus comprising a spectral image sensor, wherein the spectral image sensor comprises:

a first lens system comprising a plurality of lenses;

an infrared blocking filter;

a second lens system configured to adjust a chief ray angle (CRA) of oblique incident light to refract light passing through the second lens system to reduce a divergence of the light, and to reduce an incident angle of the oblique incident light with respect to a spectral filter, the second lens system contacting the infrared blocking filter;

the spectral filter; and an image sensor, wherein the image sensor is configured to detect light passing through the first lens system, the infrared blocking filter, the second lens system, and the spectral filter, wherein the spectral filter is between the second lens system and the image sensor, and the spectral filter contacts the image sensor, and wherein the first lens system, the infrared blocking filter, the second lens system, the spectral filter, and the image sensor are provided in that order.

19. The spectral image sensor of claim 6, wherein each of the plurality of meta-patterns has a height or diameter smaller than a wavelength of visible light or the plurality of meta-patterns are spaced apart from each other at an interval smaller than the wavelength of visible light.

20. The spectral image sensor of claim 11, wherein the Fresnel lens includes a flat surface and a patterned surface including a central convex surface surrounded by the plurality of patterns.

21. The spectral image sensor of claim 1, wherein the spectral filter is between the second lens system and the image sensor and the spectral filter is directly and optically adjacent to the image sensor.

* * * * *